Feb. 4, 1936.  E. SAUTIER  2,029,797
APPARATUS FOR THE MANUFACTURE OF CUPS FROM
WHICH CARTRIDGE CASES CAN BE COLD DRAWN
Filed Aug. 24, 1934  4 Sheets-Sheet 1
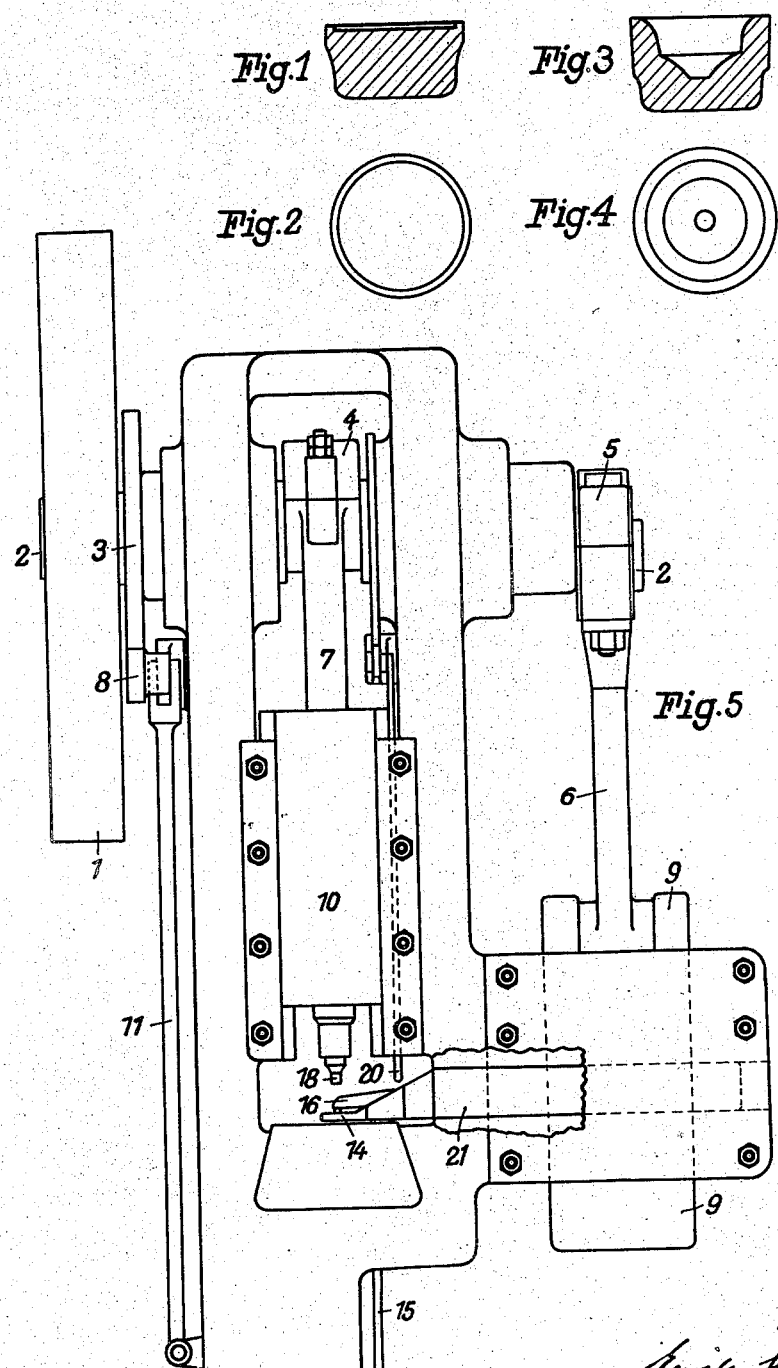
Inventor:

Feb. 4, 1936.  E. SAUTIER  2,029,797
APPARATUS FOR THE MANUFACTURE OF CUPS FROM
WHICH CARTRIDGE CASES CAN BE COLD DRAWN
Filed Aug. 24, 1934   4 Sheets-Sheet 2
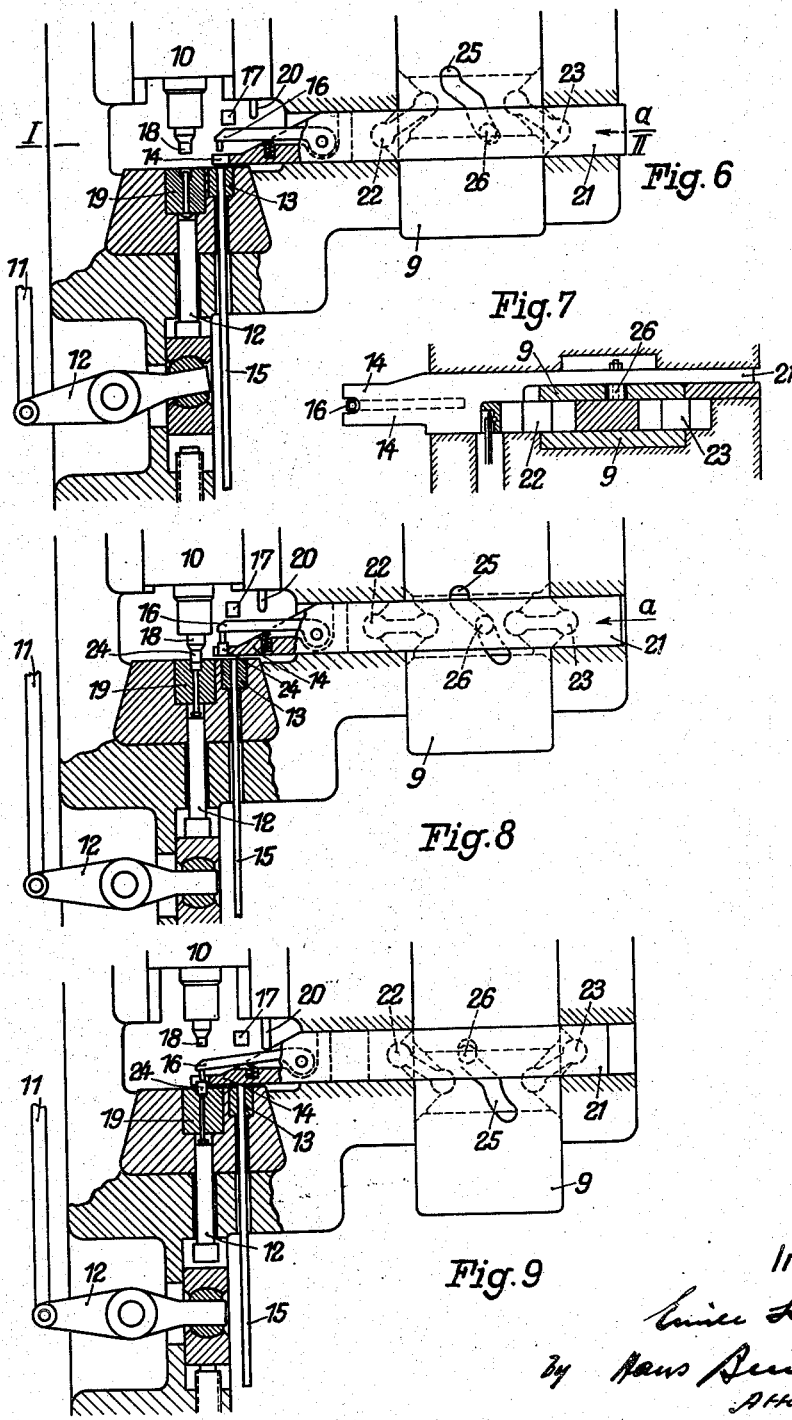

Patented Feb. 4, 1936

2,029,797

UNITED STATES PATENT OFFICE 2,029,797

APPARATUS FOR THE MANUFACTURE OF CUPS FROM WHICH CARTRIDGE CASES CAN BE COLD DRAWN

Emile Sautier, Ensisheim, France, assignor to Manufacture de Machines du Haut-Rhin S. A., Mulhouse-Bourtzwiller, Haut-Rhin, France Application August 24, 1934, Serial No. 741,273
In Switzerland September 16, 1933

1 Claim. (Cl. 29—34)

This invention relates to apparatus for the manufacture of cups from which cartridge cases and cases of projectiles can be cold drawn and is characterized in that a piece is laterally sheared off from a round bar by a knife which is arranged on a slide which, by means of pivoted members, transmits in their most favourable position the shearing pressure to the knife, after which the further conveyance of the piece sheared off is effected by the slide, which is controlled by a roller and cam groove, to the centre of a die in which the sheared-off piece is pressed by a punch, and the pressed piece through the aperture in the conveyor plate into a die and thereby shapes the pressed piece into the form of a cup, after which the cup is again inserted in the conveyor plate and is moved forwards by the conveyor plate below a second punch by the downward movement of which the cup is introduced into a die in which the bottom thickness of the cup is exactly calibrated.

An example of the apparatus is illustrated in the drawings, in which the cutting-off from the rod and the formation of the piece cut off to a pressed piece takes place in one machine and the calibration of the pressed piece to form a cup takes place in another machine. The apparatus can also be constructed in such a manner that the effective parts of both machines are fitted on a base and driven from a single driving means so that there is only one machine.

Figure 1 shows the pressed piece produced at an intermediate stage in cross section, and

Figure 2 in plan.

Figure 3 shows the cup to be formed from the pressed piece in cross section and

Figure 4 in plan.

Figure 5 shows a plan of the apparatus.

Figure 6 illustrates a horizontal section through the cutting and pressing apparatus, the parts being in the position which they occupy at the beginning of the cutting process.

Figure 7 is a vertical section through the knife slide on the line I—II of Figure 6.

Figure 8 is similar to Figure 6 but the cutting of a piece from the round rod has already taken place.

Figure 9 is also similar to Figure 6 but the piece cut off has been moved to the middle of a pressing die.

Figure 10:
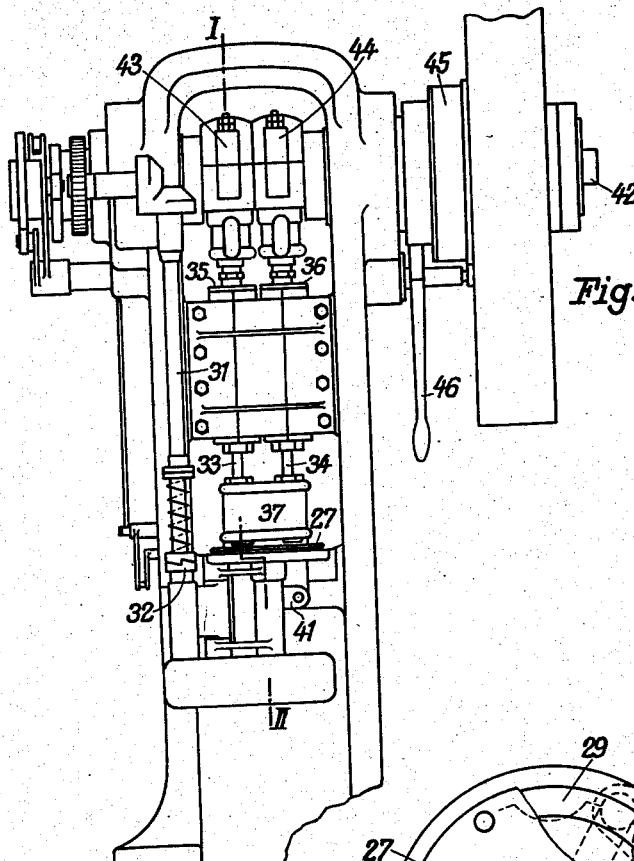
Figure 10 is a front view of the machine in which the pressed piece is formed to a cup-like shape.

Referring to the drawings, a flywheel 1 (Figure 5) is fixed on the crank shaft 2 on which three eccentrics 3, 4, 5 are fast. The eccentric 5 is connected by a rod 6 with a slide 9. The eccentric 4 is connected by a connecting rod 7 with the slide 10 of a press. The eccentric 3 transmits the motion for actuating an ejection apparatus 12 by means of a lever 8 and a rod 11. 13 is an annular knife and 14 is a movable knife. 16 is an insertion finger, which is blocked by an adjustable stop 17.

The slide 10 carries a punch 18 which is arranged opposite a die 19. 20 is a controlled pin supported on an independent slide operated by an eccentric on the main shaft. The movable knife 14 is fixed to a slide 21. The slide 21 carries a roller 26 which engages in a cam groove 25 in the slide 9. The slide 21 is also coupled to the slide 9 by the members 22, 23.

The method of operation is as follows:

A round bar 15 is automatically fed forwards in time with the machine, by means of feed rollers which are not illustrated in the drawings, through the annular knife 13 (Figure 6) and the movable knife 14 against the finger 16 which is blocked by the stop 17. The slide 21 which is driven by the slide 9 and the members 22 and 23 is set in motion together with the knife 14 in the direction of the arrow $a$ and the knife cuts from the round bar 15 a piece 24 of an exactly adjusted length. This position of the parts is illustrated in Figure 8. When the piece 24 is cut from the round bar 15 the members 22 and 23 are in the extended position (Figure 8). In this position of the members 22 and 23 the shearing pressure of the knife 14 is a maximum.

After the piece 24 has been cut off, the slide 21 is moved by the groove 25 and the roller 26 from the position shown in Figure 8 further to the left whereby the piece 24 cut off from the round bar 15 is moved as far as the middle of the die 19. The parts are now in the position illustrated in Figure 9. In this position the pin 20 presses on the finger 16 whereby the piece 24 which has been cut off is inserted in the die 19. The slide 9 has now reached its outermost deadpoint position. In this position the two members 22 and 23 are entirely released from load and only carried along. The slide 9 now returns and consequently the slide 21 also makes a return movement. The control of the slide 21 is effected by the roller 26 and the cam groove 25 as far as about the middle of the return path. The remainder of the return movement of the slide 21 is effected by the members 22 and 23 and simultaneously by the cam groove 25 and roller 26.

By means of this apparatus it is possible laterally to shear large cross sections in a machine, since it can be so designed that the members 22 and 23 are in the most favourable position for exerting the greatest cutting force when the cut is made. If the entire movement of the slide 21 were effected by the members 22 and 23 they would be in their most unfavourable position just when the cut had to take place and only a small portion of the power would be utilized for shearing and power would be wasted.

Owing to the co-operation of the members 22 and 23 with the cam groove 25 and roller 26 it is possible to shear large cross-sections with the highest efficiency.

On the return of the slides 21 and 9 the slide 10 moves into pressing position (Figure 8) and by means of the punch 18 presses the piece 24 which has been cut off into the die 19 so that it is exactly circular and has the shape illustrated in Figures 1 and 2.

On the return movement of the slide 10 the ejector mechanism 12 is actuated by the rod 11 and the pressed piece is ejected. The described procedure is then repeated.

The pressed pieces can be annealed, if desired, and can then be conducted by an automatic conveying mechanism to the conveyor plate 27 of an apparatus in which the calibrated cup illustrated in Figures 3 and 4 is formed from the pressed piece illustrated in Figures 1 and 2.

Figure 12:
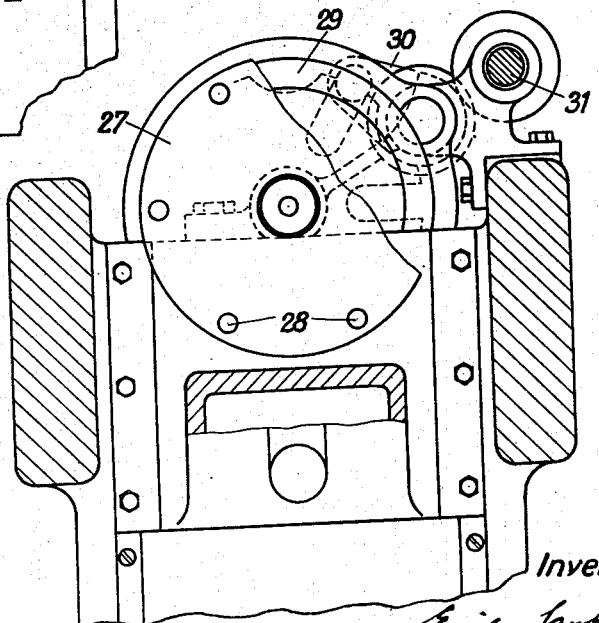
Figure 12 is a horizontal section on the line III—IV of Figure 11.
Figure 11:
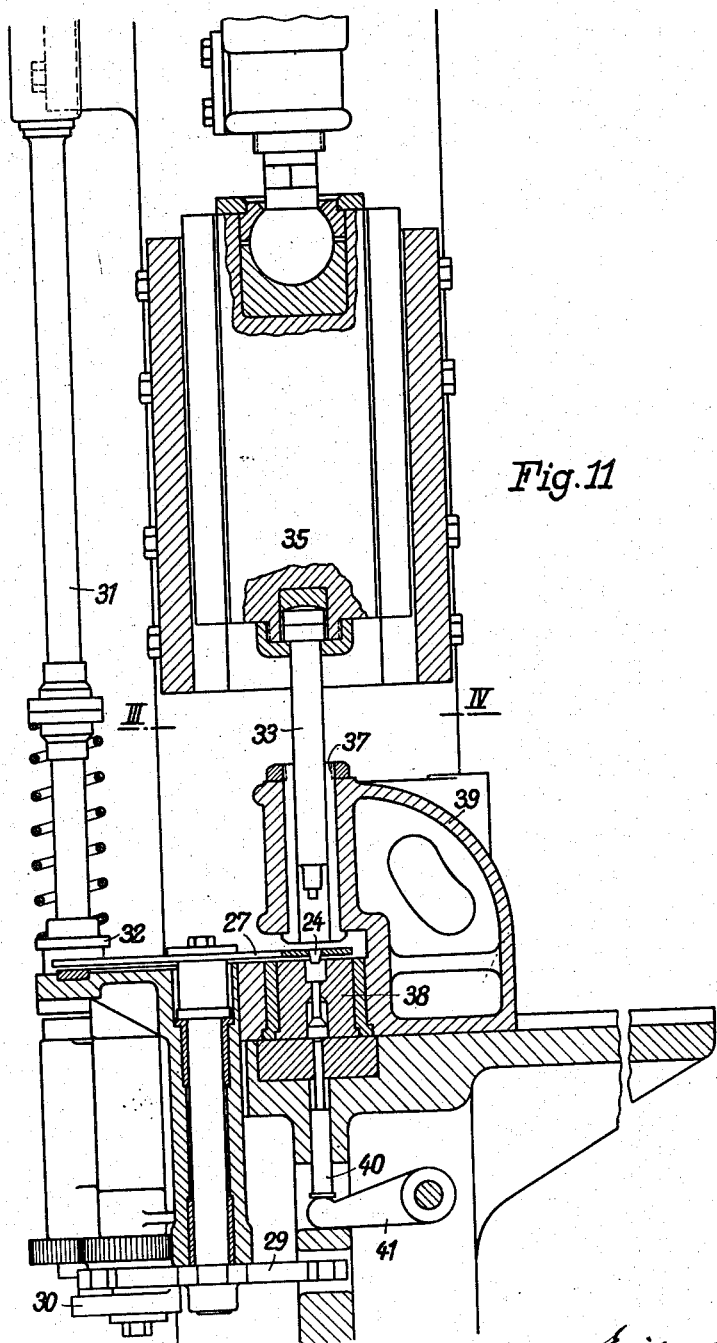
Figure 11 is an enlarged section on the broken section line I—II of Figure 10.

Holes 28 for the reception of the pressed piece are provided in the conveyor plate 27 (Figures 10, 11, 12). The conveyor plate 27 is actuated by a Maltese cross 29 which is driven by a crank shaft provided with a roller 30 from the controlling shaft 31. If a blockage occurs, the mechanism is disconnected by a clutch 32.

Two punches 33 and 34 are also provided. The punches 33 and 34 are mounted with their upper ends in the slides 35 and 36, and are guided in ground and hardened bushes 37. The pressed piece 24 is conveyed by means of the conveyor plate 27 below the centre of the first punch 33. By means of this punch 33 the pressed piece 24 is pressed into the die 38 which is arranged in the bracket 39 exactly in the centre line of the punch 33 and its guide 37, so that the centre of the die exactly coincides with the centre of the punch. On applying pressure the piece 24 is shaped to the cup-like shape illustrated in Figures 3 and 4, care being taken that the pressed piece fits at its upper end and at its lower round edge exactly in the bore of the die. After the pressure has been effected, the slide 35 returns and an ejector pin 40 is raised by the lever 41 and lifts the cup which has been formed and pushes it into a free hole 28 in the conveyor plate 27 which conveys the pressed cup a step forwards so that it arrives under the punch 34. Here the cup is pressed out of the hole 28 by means of the punch 34 into a die in which the bottom thickness is exactly calibrated. For this purpose the crank shaft 42 which is provided with the cranks or eccentrics 43 and 44 is so constructed that the eccentric 44 comes into action somewhat later than the eccentric 43. Therefore, during calibration, the pressure by the punch 33 is completed, so that on calibrating the bottom of the cup the whole of the power is available for the punch 34 and the accuracy of the bottom is thereby ensured. The pressing device is now ready for a further operation. The ejection of the calibrated cup is effected in a similar manner to that described for the die 38 so that the calibrated cup is again lifted into a hole 28 of the conveyor plate 27, which again makes a step forward, after which the cup falls or is pressed out of the hole in the conveyor plate through an opening provided.

The bracket 39, which receives both punches 33 and 34 and the dies 38 and is very exactly machined, can be withdrawn to the back after releasing the punches 33 and 34 from the slides 35 and 36 to the back for the purpose of changing the tools.

The conveyor plate 27 together with the controlling mechanism, namely the Maltese cross 29 and roller 30, can be rotated about the shaft 31, that is to say swung aside, whereby case of supervision and uniform and quick adjustment is possible. An instantaneous coupling 45, which normally disconnects when the punches 33 and 34 are raised, is provided with a lever 36 by which it can actuate the coupling 45 in any position.

I claim:

In an apparatus for manufacturing cups from which cartridge cases may be cold drawn the combination of a framing comprising a table portion provided with guides for a horizontal slide and with two vertical perforations one the feeding conduit of the work piece the other the ejecting conduit for the punched article and an upright portion with guides for vertical slides, a horizontal slide, as mentioned, carrying a pivotally held insertion finger and ending in the upper part of a shearing knife, an annular knife forming the lower part of the shearing and sunk in the table portion as the orifice of said feeding conduit, a die forming the orifice of said ejecting conduit, a first vertical slide adapted to operate the horizontal slide by means of a cam groove as guide for a roller held by the horizontal slide and of toggle members, a second vertical slide, provided with punching means, a crank shaft mounted in the upright portions of the frame and provided with eccentrics for working said vertical slides, a pin combined with another eccentric and adapted to assist said insertion finger in conveying the shorn off blanks to the die, and a ejecting device combined with further eccentrics and adapted to remove the punched articles.

EMILE SAUTIER.